July 12, 1966

E. HONORÉ ETAL 3,260,925

TRANSFORMER DEVICES FOR ELECTRICAL
COMPUTERS AND OTHER APPLICATIONS

Filed Aug. 8, 1961

July 12, 1966  E. HONORÉ ETAL  3,260,925
TRANSFORMER DEVICES FOR ELECTRICAL
COMPUTERS AND OTHER APPLICATIONS
Filed Aug. 8, 1961  12 Sheets-Sheet 4

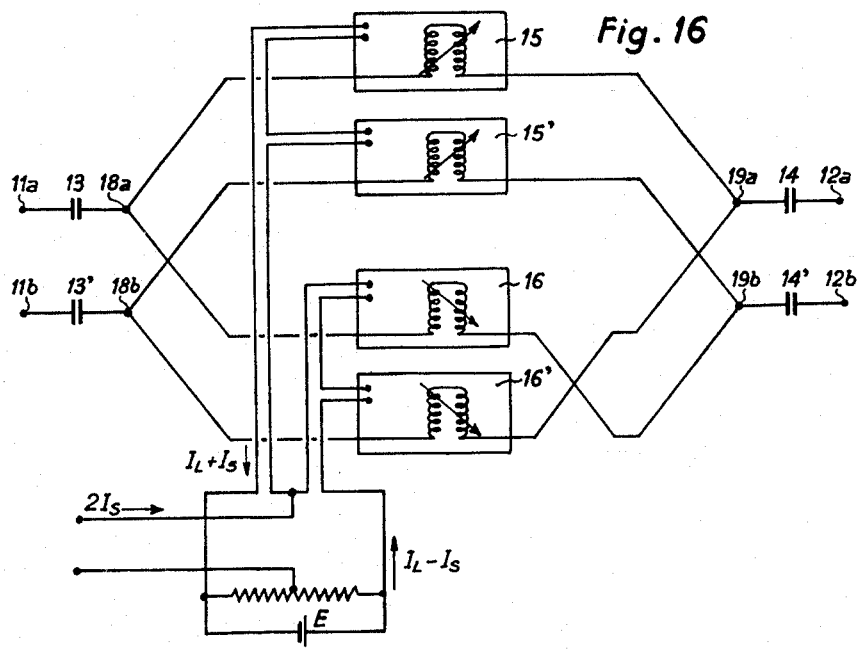
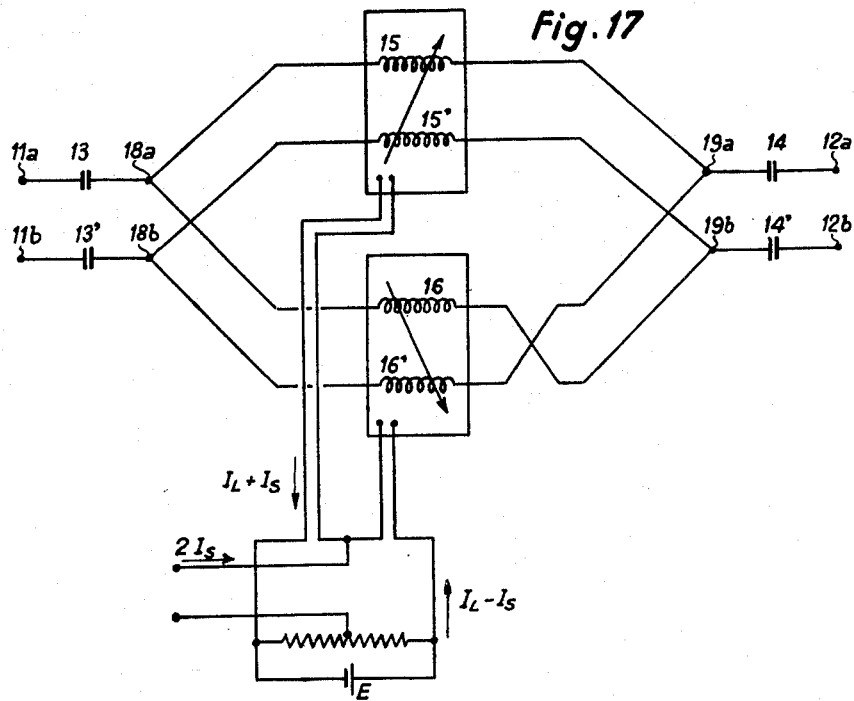

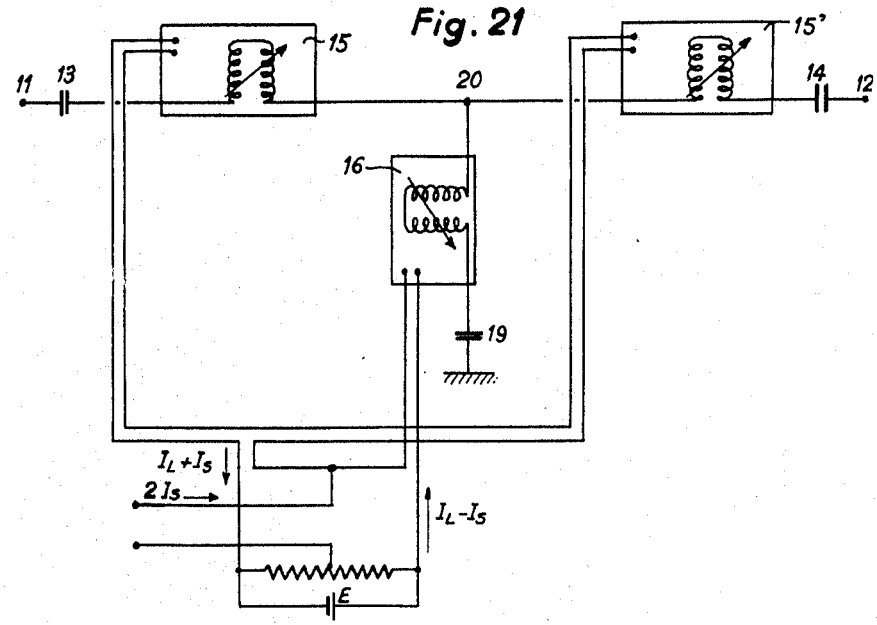
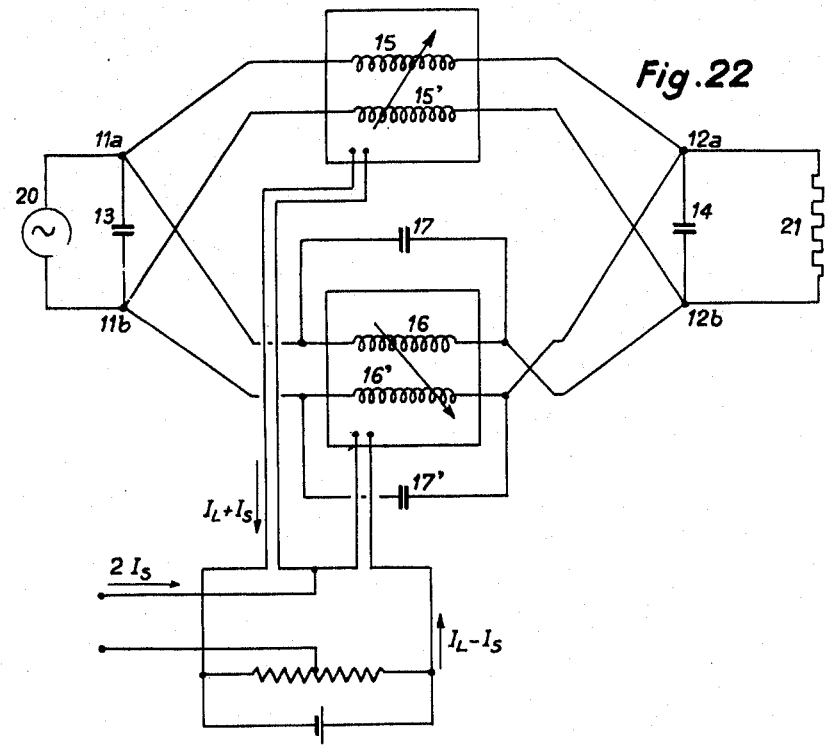

Fig. 26
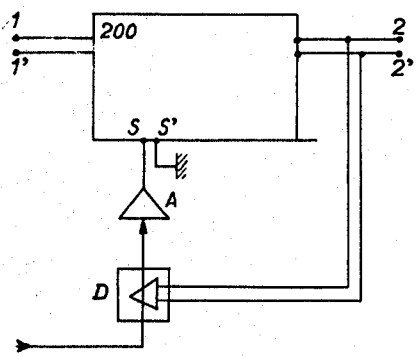
Fig. 27
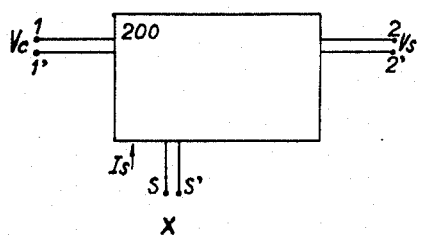
Fig. 28
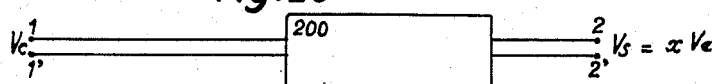
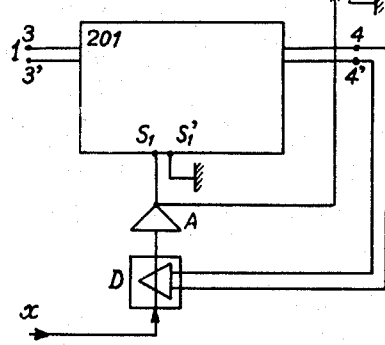
Fig. 29
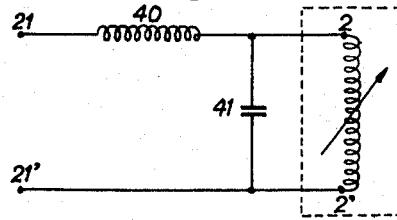
Fig. 30
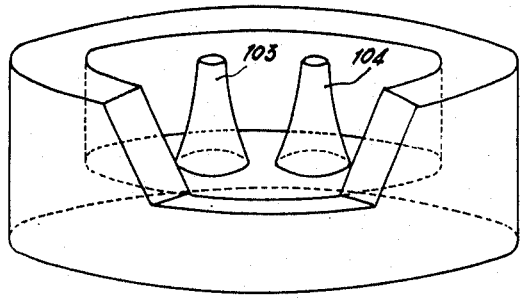

3,260,925
Patented July 12, 1966

1

3,260,925
TRANSFORMER DEVICES FOR ELECTRICAL COMPUTERS AND OTHER APPLICATIONS
Etienne Honoré and Emile Torcheux, Paris, France, assignors to Compagnie Generale de Telegraphie Sans Fil, a corporation of France, and Societe Marocaine de Recherches, d'Etudes et de Developpements Somarede, a corporation of Morocco
Filed Aug. 8, 1961, Ser. No. 130,165
Claims priority, application France, Aug. 8, 1960, 835,268
15 Claims. (Cl. 323—76)

The present invention relates to an improvement of the quadripole and tripole devices disclosed in the co-pending application Serial No. 709,383 (now Pat. 3,127,555), filed by the applicants on January 16, 1958.

According to the invention, a quadripole comprises necessarily inductances adjustable by the magnetic-permeability variation of associated magnetic circuits, as well as fixed capacitances, these elements connecting together the various terminals in such a manner that, on short-circuiting the two input or output terminals, the admittance or impedances occurring between the other two terminals are tuned on at least a certain fixed frequency, called the "operating frequency," a tripole will present the same characteristics, but, in this case, one of the input terminals and one of the output terminals are grounded and form a single element.

The variable inductances of the quadripole and the tripole are provided by fixed magnetic circuits, one winding of which, through which flows an adjustable current, causing the magnetic permeability to be varied.

The invention will be best understood from the following description and appended drawings, wherein.

Figure 8:
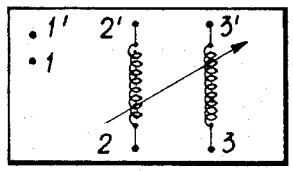

FIG. 8 indicates the symbol adopted in the present description to represent the element illustrated in the preceding figures.

Figure 1:
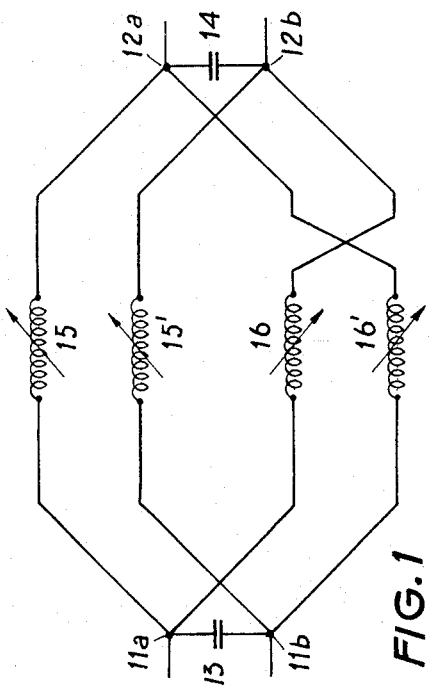
FIG. 1 is a quadripole device, as described in the co-pending U.S. patent application Serial No. 709,383 mentioned hereinabove.
Figure 9:
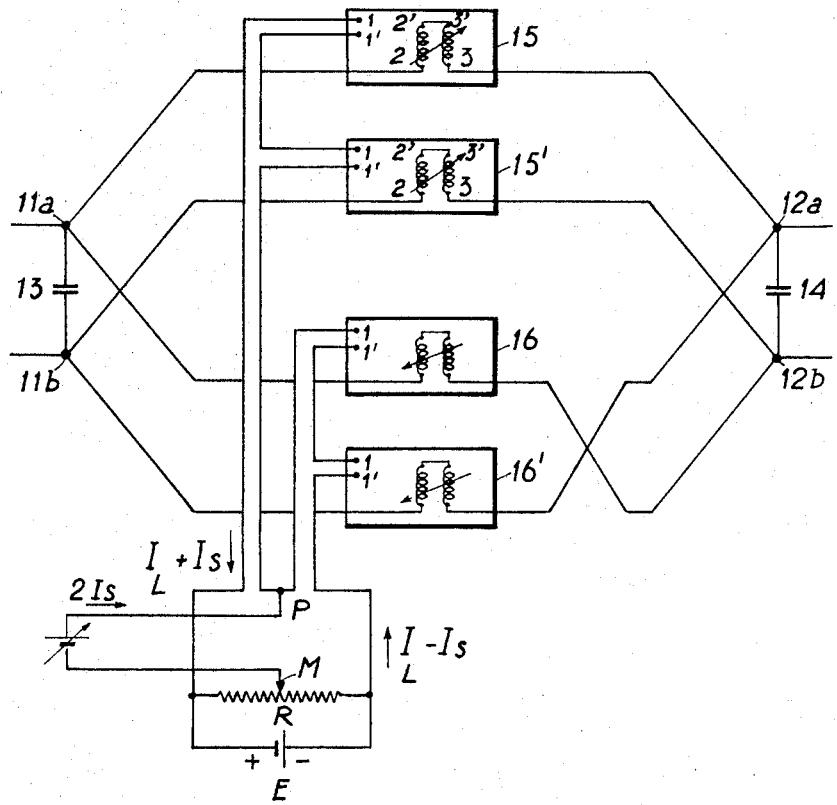

FIG. 9 is a first embodiment of the quadripole in FIG. 1.

Figure 10:
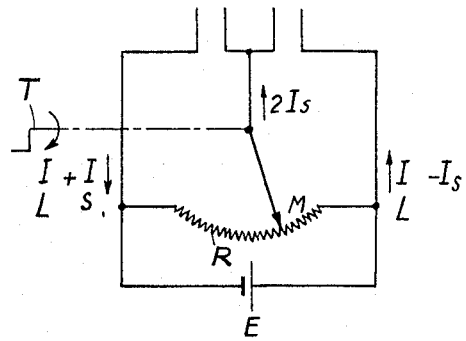

FIG. 10 is an alternative embodiment of the control device.

Figure 11:
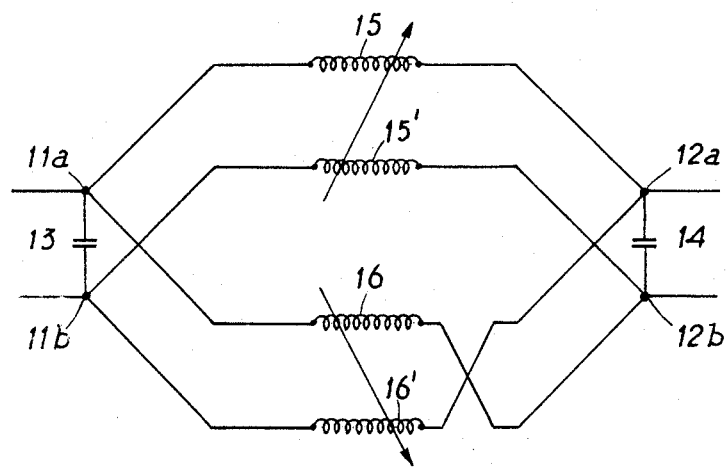

FIG. 11 is a further embodiment of the quadripole according to the above patent application.

Figure 12:
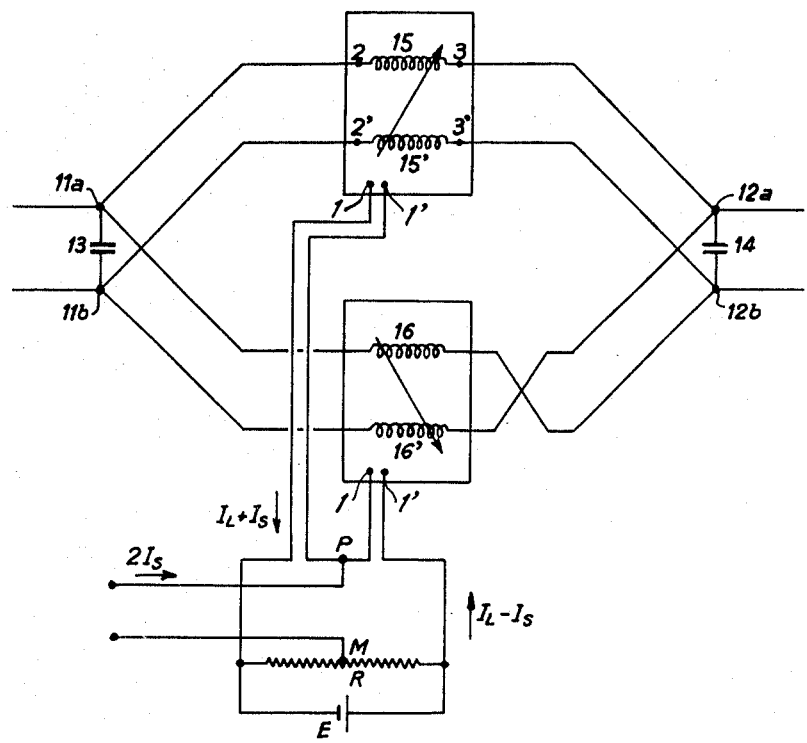

FIG. 12 is an embodiment, by way of example, of the quadripole illustrated in FIG. 11, according to the invention.

Figure 13:
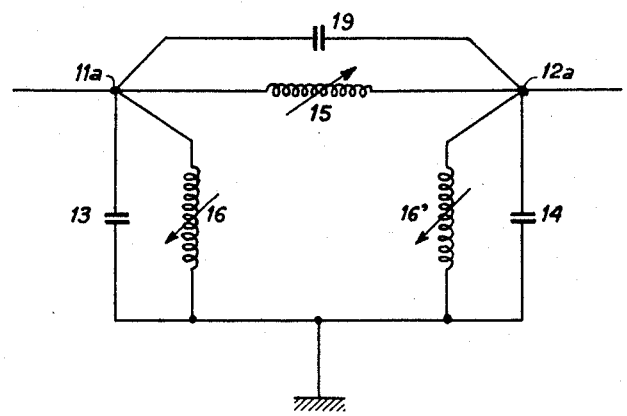

FIG. 13 is a tripole according to the above U.S. patent application.

Figure 14:
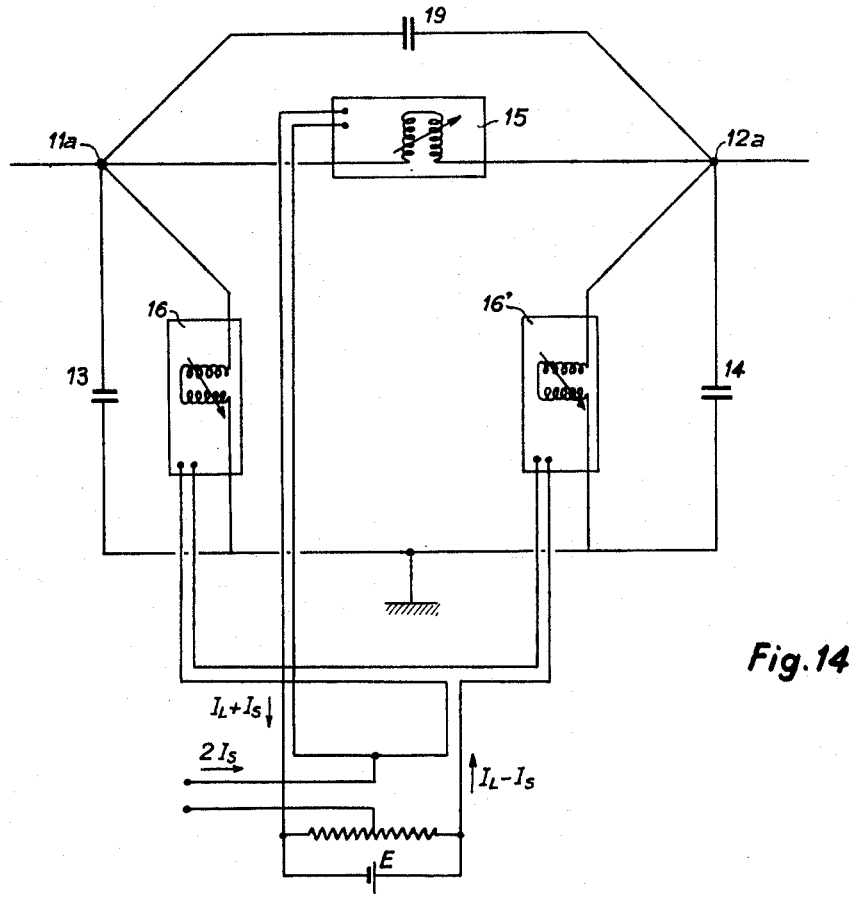

FIG. 14 is an embodiment, by way of example, of a tripole illustrated in FIG. 13, according to the invention.

Figure 15:
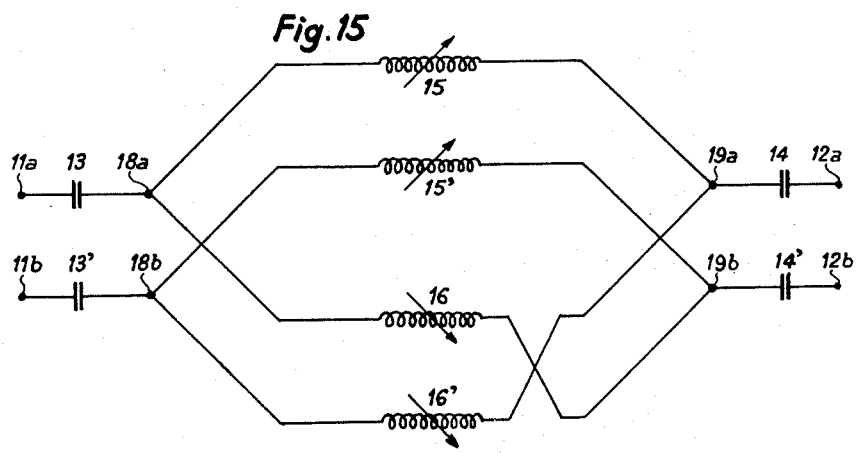

FIG. 15 is a wiring diagram of a first impedance-matched quadripole, according to the above U.S. patent application.

FIG. 16 is an embodiment, according to the invention, of the wiring diagram illustrated on FIG. 15.

FIG. 17 is a further embodiment, according to the invention, of the wiring diagram in FIG. 15.

Figure 18:
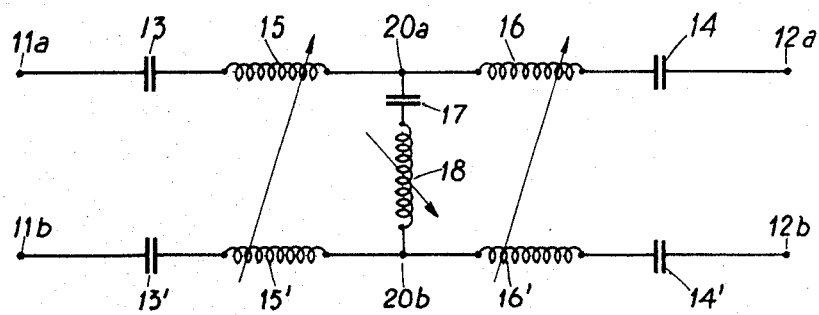

FIG. 18 is a diagrammatic arrangement of a second embodiment, by way of example, of a quadripole according to the above U.S. patent application.

2

Figure 19:
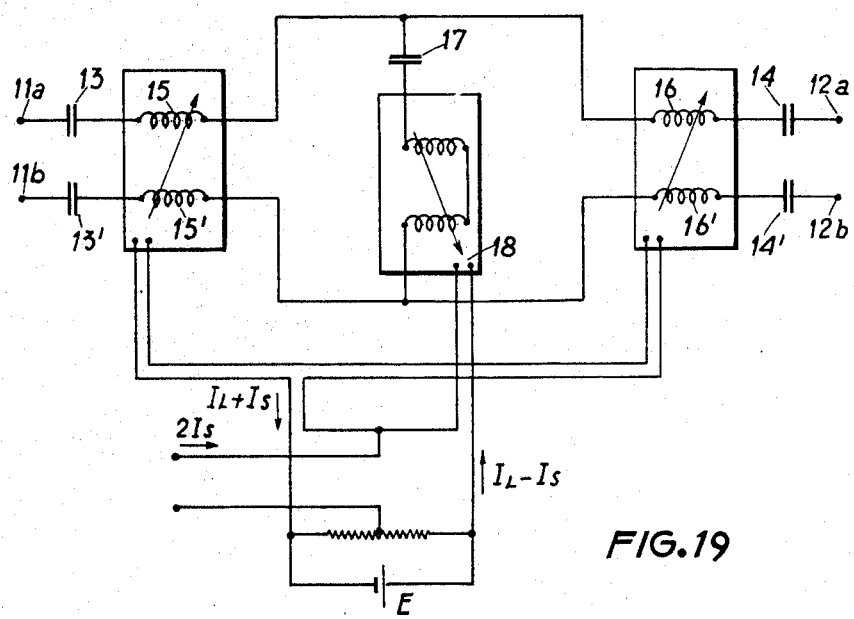

FIG. 19 is an embodiment, by way of example, according to the invention, of the diagrammatic arrangement illustrated in FIG. 18.

Figure 20:
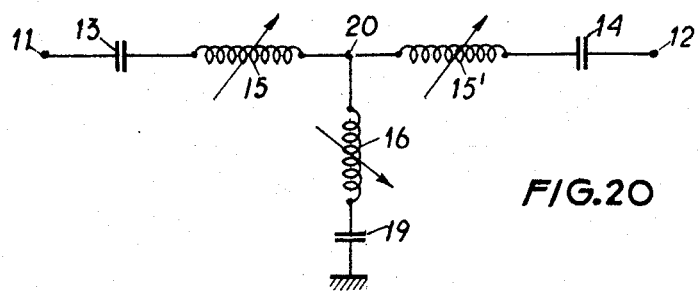

FIG. 20 is a diagrammatic arrangement of a tripole according to the above U.S. patent application.

FIG. 21 is an embodiment, by way of example, according to the invention, of a tripole illustrated in FIG. 20.

FIG. 22 illustrates an application, by way of example, of a quadripole according to the invention.

Figure 23:
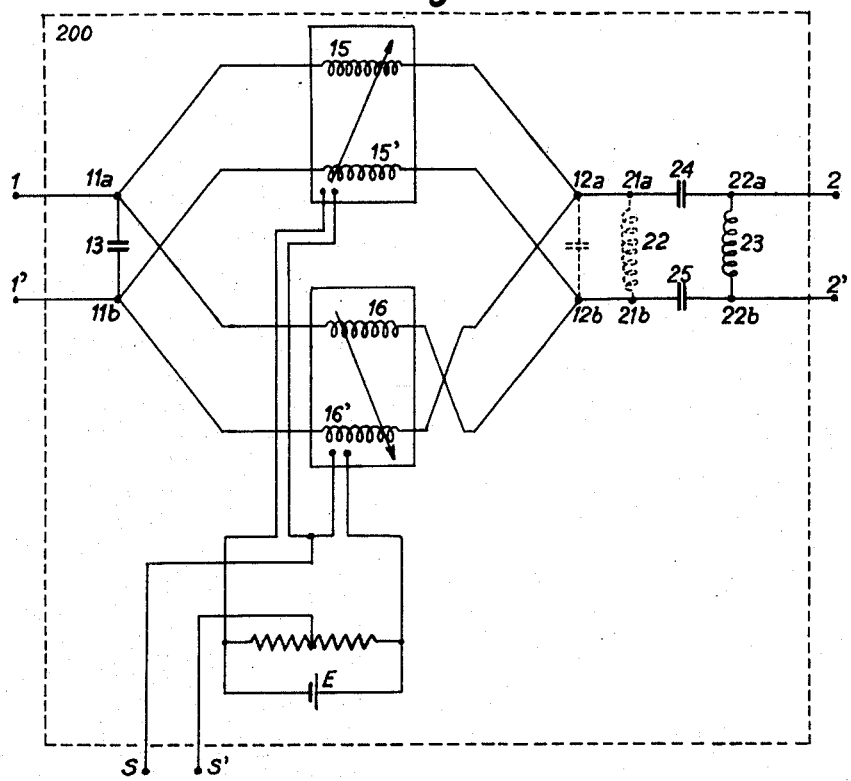

FIG. 23 illustrates an example of a computing cell with adjustable multiplying ratio, incorporating a quadripole according to the invention.

FIGS. 24 through 28 show, diagrammatically, a few applications of this cell.

FIG. 29 illustrates a diagrammatic arrangement of an adaptor device for improving the performances of the inductances of the quadripoles of the invention.

FIG. 30 is a perspective view of an arrangement of the magnetic circuits used in the quadripoles according to the invention, adapted to improve the linearity range of the inductances.

Referring first to FIG. 1, a quadripole is shown as disclosed in co-pending U.S. patent application Serial No. 709,383, filed January 16, 1958 (now Pat. 3,127,555) and which will be termed, for convenience, in the present specification as the "first invention."

This quadripole comprises two input terminals, $11a$, $11b$ and two output terminals $12a$, $12b$. A fixed capacitor $13$—termed "primary capacitor"—is connected across the terminals $11a$ and $11b$ and a similar capacitor $14$—termed "secondary capacitor"—is connected across the output terminals $12a$ and $12b$.

The two input terminals $11a$, $11b$ are each connected to the two output terminals $12a$, $12b$, respectively, through two variable inductors $15$ and $15'$, having a susceptance equal to $-(K+x)/\omega_0$, and through two variable inductors $16$ and $16'$, having a susceptance equal to $-(K-x)/\omega_0$ ($\omega_0$ designating the angular frequency of the angular frequency of the operating frequency $f_0$).

The constant K has a fixed value, and the value of $x$ may vary between $-K$ and $+K$, while maintaining the same value in the four inductors $15, 15', 16$ and $16'$. In other words, the inductors of each pair $15-15'$, and $16-16'$ have their susceptance varying from 0 to $2K/\omega_0$.

This quadripole has the properties disclosed in the first invention and no further details will be given thereabout; it will only be recalled that, upon short-circuiting any one of the capacitors, the remainder of the quadripole is tuned on the operating frequency $f_0$.

The present invention has for its object to provide a new embodiment of the four variable inductors $15-15', 16-16'$. In this embodiment the inductance of coils $15, 15', 16$ and $16'$ is caused to vary by varying the permeability of their magnetic circuits, under the action of a D.-C. control.

The gist of the invention will be first explained with reference to FIGS. 2, 3 and 4.

Figure 2:
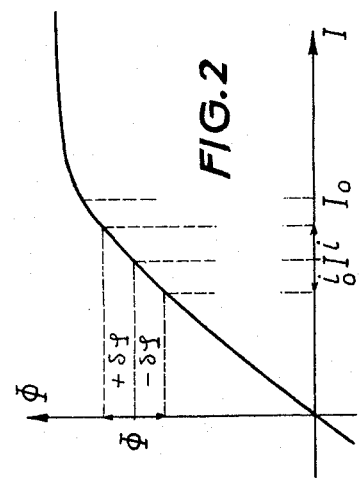

FIG. 2 shows, as a function of the instantaneous value I of a D.C. current circulating in a winding surrounding all or a portion of a magnetic circuit, the values of the magnetic flux $\Phi$ produced in said circuit by said circuit by said current. Curve $\Phi = f(I)$ has a first straight line portion; for a value of $I > I_0$, the slope of the curve decreases continuously and attains, for sufficiently high values of I, a fixed low value.

It may be shown that, if the magnetic circuit considered comprises at least a portion surrounded by another coil wherein flows an alternating current $$i = i_0 \cos(\omega_0 t + \varphi)$$

$i_0$ being small, with respect to I, this coil will oppose to this alternating current an impedance given by the formula $$Z = k \cdot \frac{d\Phi}{dI}$$

and an admittance $$A = \frac{dI}{k \cdot d\Phi}$$

where $k$ is a constant depending on the magnetic circuit.

Figure 3:
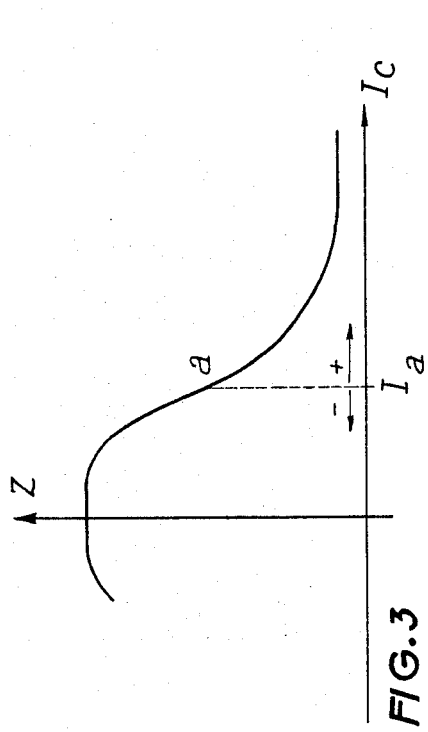
FIGS. 2, 3, 4 are explanatory curves relating to the saturation phenomenon.
Figure 4:
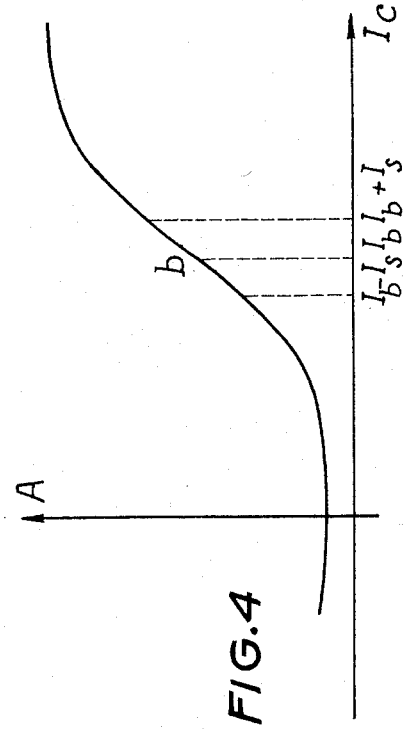

FIGS. 3 and 4 represent as a function of the D.C. control current $I_c$ the values A and Z for the same coil.

As may be readily seen, the two curves respectively present two points of inflection $a$ and $b$, corresponding to two different values of I, $I_a$ and $I_b$.

Therefore, if $I_c$ is close to $I_b$, the admittance of the coil is a linear function of the D.C. control current $I_c$.

Figure 5:
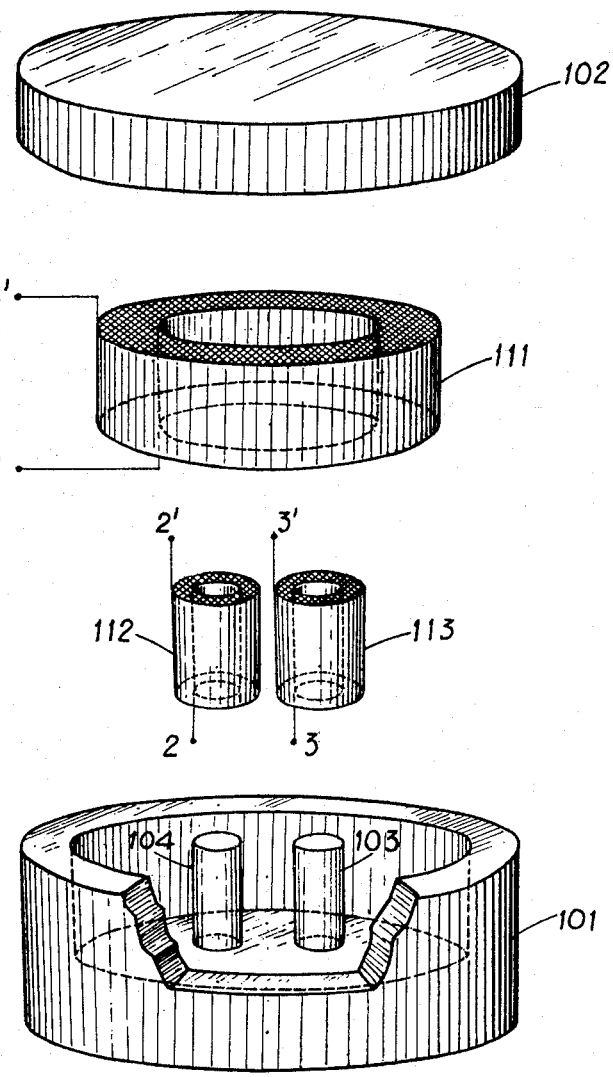
FIG. 5 is an exploded perspective view of the inductances used in the device of the invention.
Figure 6:
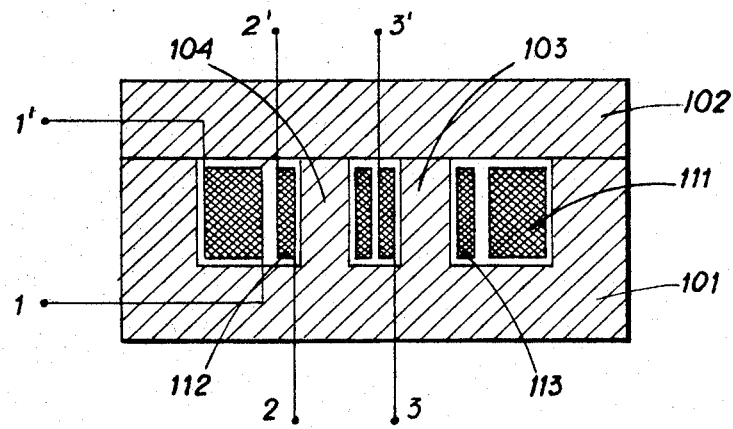
FIG. 6 is a transversal cross-sectional view of the device illustrated in FIG. 5.

FIGS. 5 and 6 are an example of a variable induction coil according to the invention.

The magnetic assembly comprises a cylindrical hollow pot magnet 101 and a cover 102 fitting said pot. Within pot 101 two identical cylindrical cores 104 and 103 are secured. A winding 111 is positioned in pot 101. It has two terminals 1 and 1'. Around cores 103 and 104 are wound, in the same direction, two coils 112 and 113, having terminals 2–2' and 3–3' positioned as shown in FIG. 5.

Figure 7:
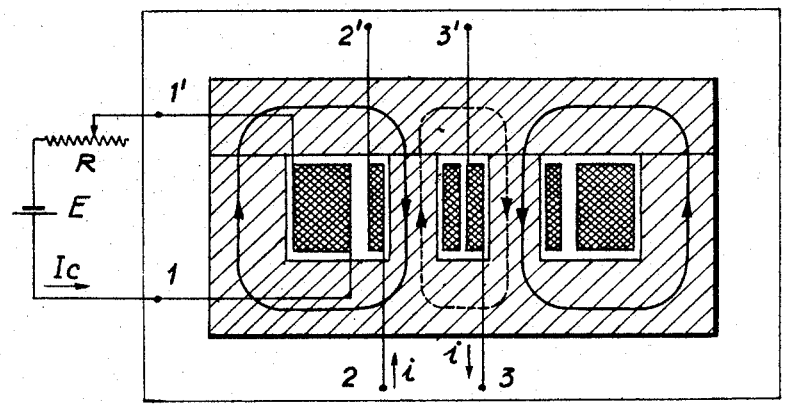
FIG. 7 is a cross-sectional view explaining the operation of this device.

As may be seen in FIG. 7, terminals 1–1' are connected to a D.C. source E through a potentiometer R. The solid lines indicate in this figure the paths of the lines of force of the continuous magnetic flux through pot 101, cover 102 and cores 103 and 104.

The operation of the unit is as follows:

Coil 111, through which flows a variable direct current $I_c$, by adjusting the potentiometer R, causes a magnetic flux $\Phi$ to flow through cores 103 and 104, which flow varies as a function of $I_c$, as shown in FIG. 2. Current $I_c$ may be selected in certain applications so that it operates in the neighborhood of point $b$. This results in the admittance of coils 112 and 113 varying, in a certain range of variation of $I_c$, proportionally thereto.

Now, alternating current $i = i_0 \cos \omega_0 t$ is caused to flow through both coils 112 and 113. Alternating lines of force will thus be produced in cores 103 and 104, as shown by the dotted line in FIG. 7, in one direction during one alternation, and in the reverse direction during the following alternation. There will, therefore, occur in cores 103 and 104 an alternating variation $\Delta \varphi$ of the flux around the value $\Phi$ as determined by the value $I_c$.

The frequency of the alternating current is generally sufficiently high, for coils 112 and 113 to have a high impedance ($Z = jL\omega_0$). It follows that the alternating current $i$ will always be small with respect to $I_0$ and that flux variations $\Delta\varphi$ are small relative to $\Phi$. The impedance or admittance of the coils 112 and 113 is thus a function only of the control direct current $I_c$.

In one embodiment, the material employed was the ferrite T11 (initial permeability without saturation: 1700). Coils 103 and 104 had a diameter equal to 5.8 mm. and a height of 13 mm. The control coil 111 had 3700 turns of a wire of 10/100 and a resistance of 500Ω. Coils 112 and 113 had 93 turns of wire strands of 5/100.

Before being mounted on the magnetic cores, each coil tuned on a capacitive admittance of 4000 pf. at 472 kc./s.

By varying the direct current $I_c$ between 0 and 15 milli-a. (maximum power 0.1 watt), the admittance of each inductance varies between a value which is substantially zero (or even negative, on account of the parasite capacities) and to an admittance equal in absolute value, to that of a capacitor of 600 pf. For $I_c$ varying from 4.5 ma. to 10 ma., the variation of the admittance is substantially linear from about 100 to 400 μf. The Q factor of the inductance coils varies, under the same conditions, from 400 for $I_c = 4.5$ ma. to 210 for $I_c = 10$ ma.

It should be noted that the alternating fluxes close only through cores 104 and 103, without extending through the peripheral portions of pot 101 and, moreover, they are always directed in the opposite direction in these cores.

FIG. 8 is a symbolical illustration of the above arrangement. There exists two utilization possibilities:

The two terminals 2' and 3' are short-circuited and the two coils are thus connected in series and build up a single coil;

Coils 112 and 113 are used independently from one another.

FIG. 9 shows the same arrangement as FIG. 1, wherein units similar to those shown in FIGS. 7 and 8 have been used instead of conventional coils 15, 15', 16, 16'. These units have their D.C. control circuits arranged in the following manner:

The D.C. supply source E is connected across a resistance R having a mid-point M. Terminals 1–1' of the inductors 15, 15', 16, 16' are connected in series between the plus and minus terminals of the supply source E delivering a current $I_L$, termed "local fixed current." Between point M and point P of the circuit thus formed (where P is intermediary terminals 1, 1' of inductors 15, 15', on the one hand, and to terminals 1, 1' of inductors 16, 16' on the other) is applied a variable control voltage, termed "signal voltage." This voltage generates, between points M and P, a variable current $2I_s$, or "signal current."

With this arrangement, a current $I_c = I_L + I_s$ flows through the control coils of the inductors 15, 15', and a current $I'_c = I_L - I_s$ flows through the control coils of inductors 16, 16'.

According to the invention, the four inductors 15, 15', 16, 16' have the same characteristic curve $A = f(I)$, as shown in FIG. 4; $I_L$ corresponds to $I_b$.

Thus, the admittance $A_{15}$ and $A_{15'}$, will be linear functions of $I_L + I_s$, $$A_{15} = A_{15'} = a + b(I_L + I_s)$$

and $$A_{16} = A_{16'} = a + b(I_L - I_s)$$

This gives, for the variation range of $I_s$, the following relation:

$$A_{15} + A_{16} = A_{15'} + A_{16'} = 2a + 2b \cdot I_L = \text{constant}$$

By conveniently selecting capacitors 13 and 14, the quadripole unit will be tuned on the operating frequency i.e. to the frequency at which the quadripole must be resonant.

FIG. 10 illustrates another embodiment of a quadripole controlling device such as that shown in FIG. 9.

In this figure the variation of current $I_s$ is obtained by varying the position of a point M on the resistance R (for example, by means of a handle T.)

FIG. 11 is an alternative embodiment of the diagram shown in FIG. 1. In this figure, inductance coils 15, 15' and 16, 16', are adjustable by means of the same adjusting devices.

On the other hand, if a constant coupling is provided between the inductors 15, 15', the latter being subjected to the same voltage and traversed by currents of the same intensity, on account of the symmetry of the quadripole, the inductance of each coil is multiplied by the same constant coefficient.

The same is true for inductors 16, 16'. This feature makes it possible to use a single unit, such as the one shown in FIG. 5, to provide two inductors, which vary while remaining equal to each other.

FIG. 12 shows a quadripole, according to the invention.

A first unit such as the one shown in FIG. 8 has its terminals 2 and 3 connected to terminals $11_a$ and $12_a$ and its terminals 2' and 3' connected to the terminals $11_b$ and $12_b$. It comprises the two inductors 15 and 15'. Similarly a second unit has its terminals 2 and 3 connected to $11_a$ and $12_b$, respectively, and its terminals $2'$, $3'$ to $11_b$ and $12_a$, respectively and comprises the two inductors 16 and $16'$.

The control device comprises a circuit similar to that of FIG. 9.

The unit operates as follows: the coupling between inductors 15, $15'$ being constant, it is as though each one thereof had an admittance:

$$B_{15}=B_{15'}=hA_{15}=hA_{15'}$$

$A_{15}$, $A_{15'}$ being the admittances of each winding taken separately and $h$ being the constant coupling therebetween.

Similarly, $$B_{16}=B_{16'}=hA_{16}=hA_{16'}$$

Both assemblies 15, $15'$ and 16, $16'$ being identical and $h$ having the same value in both, the operation thereof is identical to that in FIG. 9.

FIG. 13 illustrates a tripole of the type described in the first invention. It comprises an input terminal $11_a$, an output terminal $12_a$ and a grounded terminal.

A variable inductor 15 connects terminals $11_a$ and $12_a$ and two variable inductors 16, $16'$ respectively connect terminals $11_a$ and $12_a$ to ground. Two capacitors 13, 14 are connected in parallel with inductors 16, $16'$ and capacitor 19 is connected in parallel with inductor 15. The susceptances of these elements are the following:

Variable inductor 15: $-(k-x)/\omega_0$
Variable inductors 16, $16'$: $-(k+x)/\omega_0$
Capacitors 13, 14, 19: $k/\omega_0$
($x$ being variable and $k$ constant)

In other words, the sum of the susceptances of inductor 15 and of one of inductors 16, $16'$ is constant: thus; the tripolo is tuned on the operating frequency $f_0 = \omega_0/2\pi$.

FIG. 14 represents a further tripole according to the invention.

Inductors 15, 16, $16'$ are units similar to those of FIG. 8, terminals $2'$, $3'$ being short-circuited. The D.C. control circuit is similar to that of FIG. 9 and is such that inductors 16, $16'$ receive a control current $I_L - I_s$ and inductor 15 a control current $I_L + I_s$. The operation of this circuit is self explanatory.

FIG. 15 illustrates a quadripole similar to that disclosed in the French Patent No. 1,185,378, filed January 31, 1957, except that capacitors 13, $13'$, 14, $14'$ have fixed values and inductors 15, $15'$, 16, $16'$ are variable, the quadripole being arranged as shown in the figure. Inductors 15, $15'$ and 16, $16'$ have the same inductance respectively:

$$L_{15}=L_{15'}=(k+x)/\omega_0$$
$$L_{16}=L_{16'}=(k+x)/\omega_0$$

The four capacitors 13, $13'$, 14, $14'$ have the same capacitance: $C=-\frac{1}{2}k\omega_0$.

The quadripole is thus tuned on the frequency $f_0$.

Whatever, the value of $x$, the following relation stands:

$$L_{15}+L_{16}=L_{15'}+L_{16'}=2k/\omega_0=\text{constant}$$

FIG. 16 shows how such a quadripole may be provided with units such as that in FIG. 8. The arrangement of inductors 15, $15'$, 16, $16'$ is rigorously identical to that shown in FIG. 9.

The operation will be readily understood, reference being made to curves shown in FIG. 3; $I_L$ is made equal to $I_a$, which is the current corresponding to the point of inflection $a$. The signal-current $I_s$ varies in such a manner that the values $L_L - I_s$, $I_L + I_s$ correspond to the straight line portion of the curve so that the following relation may be written:

$$Z_{15}=Z_{15'}=l+m\ (I_L+I_s)$$
$$Z_{16}=Z_{16'}=l+m\ (I_L-I_s)$$

and $$Z_{15}+Z_{16}=2l+2mI_L=\text{constant}$$

The quadripole may thus be tuned on a fixed frequency, by conveniently selecting the capacitors 13, $13'$, 14, $14'$.

FIG. 17 is an alternative embodiment of the quadripole in FIG. 15, wherein the properties explained with reference to FIG. 11 are used.

The arrangement of inductors 15, $15'$, 16, $16'$ is identical to that of FIG. 12.

The impedances of the four inductors being multiplied by the same constant factor, the operation will be same as in FIG. 16; the capacitors 13, $13'$, 14, $14'$ are of course suitably selected.

FIG. 18 is an alternate embodiment of the quadripole shown in the second of the patent applications mentioned above, this quadripole being equivalent to that in FIG. 15. This quadripole comprises three pairs of terminals $11_a$, $11_b$, $20_a$, $20_b$ and $12_a$, $12_b$. The terminals $11_a$ and $20_a$, are connected by an inductor 15 and a capacitor 13 connected in series and terminals $11_b$ and $20_b$ by an inductor $15'$ and a capacitor $13'$ also in series.

Similarly, the terminals $20_a$, $12_a$, $20_b$ and $12_b$ are connected together by an inductor and capacitor, in series, namely inductors 16, $16'$ and capacitors 14, $14'$. Terminals $20_a$, $20_b$ are connected to an inductor 18 and a capacitor 17 in series.

Capacitor 13 and inductor 15 connected in series have an impendance equal to $X/2$. The same is true for $13'-15'$, $16-14'$, $16'-14$.

The impedance of the inductor 17 and capacitor 18 in series is $-X$.

Inductors 15, $15'$, 16, $16'$ have an impedance:

$$Z_{15}=Z_{15'}=Z_{16}=Z_{16'}=K+X/2$$

capacitors 13, $13'$, 14, $14'$ have an impedance:

$$Z_{13}=Z_{13'}=Z_{14}=Z_{14'}=-K$$

inductor 18 has an impedance $Z_{18}=H-X$ and capacitor 17 has an impedance $Z_{17}=-H$, for the operating frequency considered.

The operation of the quadripole is identical to that described in FIG. 2 of the second invention.

FIG. 19 is an embodiment according to the invention of the quadripole shown in FIG. 18, this quadripole comprising such elements as those of the first and second arrangement of FIG. 8.

The arrangement shown in FIG. 20 corresponds to that given in FIG. 11 of the second invention, and illustrates a tripole having two terminals 11, 12 and one grounded terminal. The terminal 11 is connected to an intermediate terminal 20 by means of a fixed capacitor 13 and a variable inductor 15 in series. Terminal 20 is grounded by means of a variable inductor 16 and a fixed capacitor 19 in series.

The reactances of these various elements are as follows:

Inductors 15, $15'$: $Z_{15}=Z_{15'}=K+X$
Inductor 16: $Z_{16}=K-X$
Capacitors 13, 14, 19: $Z_{13}=-K$ FIG. 21 shows how this arrangement is built up according to the invention, by using units such as those illustrated in FIG. 8.

The inductors 15, $15'$ receive the control current $I_L+I_s$, inductor 16 receives the control current $I_L-I_s$, according to the diagram of FIG. 14.

FIG. 22 is similar to FIG. 9 of the first invention. The quadripole shown is an alternative embodiment of FIG. 12, except that capacitors 17, $17'$ are connected in parallel with the inductors 16, $16'$, respectively.

For the operating frequency considered, the admittances of these elements are the following:

Inductors 15, $15'$: $-(K+X)$
Inductors 16, $16'$: $-(K-X)$
Capacitors 17, $17'$: $+2H$
Capacitors 13, 14: $K-H$ If the variable magnitude X is such that it varies between $-H$ and $+H$, it may be easily shown that the transfer admittance of this quadripole, as defined by relation $I=EU$ ($I=$ the intensity appearing at the output when a voltage U is applied at the input), varies between 0 and 2X.

Consequently, in the case of FIG. 22, where between terminals $11_a$ and $11_b$ of the quadripole a supply source 20 is connected having a constant R.M.S. voltage U, for example of a frequency of 472 kc./s., and between its terminals $12_a$, $12_b$, is connected a resistor 21 having a value R, the power dissipated in resistor R is:

$$P=RU^2(H+X)^2$$

A simple calculation shows that, for the quadripole having the characteristics given hereinabove, the following values are obtained:

for capacitance K
$$K=+250 \text{ pf.}$$
for capacitance H
$$H=+150 \text{ pf.}$$

If $U=200$ volts and $R=1000$ ohms, the power dissipated in resistor R will vary from 0 to 40 watts, whereas the power necessary for obtaining this result would be 6 milliwatts.

FIG. 23 is a quadripole similar to that shown in FIG. 12, coupled to a fixed quadripole, thus providing a multiplying circuit, such as those described in the first invention. The latter quadripole comprises, as is known, two capacitors 24, 25, two inductors 22, 23 connected, as shown, to terminals $12_a$, $12_b$, 2, 2', and tuned to the same frequency $f_o$. The circuit formed by these quadripoles is a multiplier circuit 200. This circuit is such that if a voltage $V_e$ is applied to terminals 1, 1', a voltage $V_s=X/K$ will be collected at the terminals 2, 2', X being obtained by adjusting the adjustable quadripole and equal to $$X=(A_{15}-A_{16})/2K$$

2K being the fixed admittance of capacitors 24 and 25, X being in a definite ratio with the signal-current $I_s$ $$X=\lambda I_s$$

where $\lambda$ is a characteristic of the inductors constituting the first quadripole.

X is the transfer admittance of the first quadripole.

The electrical properties of this circuit are known; according to the invention, the variable magnitude X is adjusted by purely electrical means, without using any mechanical system.

Figure 24:
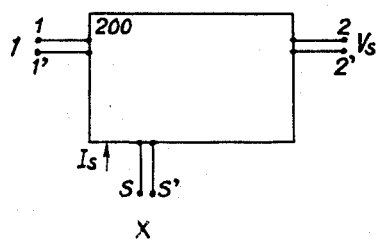

FIGS. 24 through 28 show a few applications. In FIG. 24, a circuit 200 of the type illustrated in FIG. 23 is shown. It receives at its terminals 1, 1' the unity voltage and delivers at its output voltages 2, 2' the voltage $V_s=X/K$, the control current $I_s$ of circuit 200 being proportional to the magnitude X.

The circuit 200 thus operates as a follow-up system, within a factor $k$, which will be assumed in the following to be equal to 1.

Figure 25:
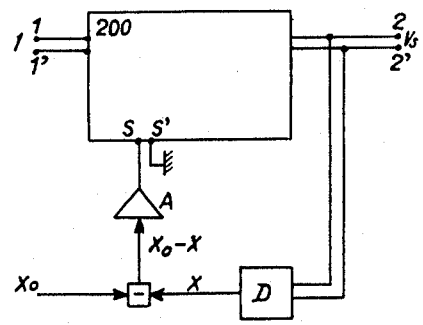

The device in FIG. 25 is of a similar type, but comprises a negative feedback loop. The device receives at its input terminals 1, 1' a unity voltage and delivers at its output terminals 2, 2' voltage $V_s=x$ (the coefficient $k$ being selected equal to unity). The voltage $V_s=x$ is applied to the input of a detector D which delivers a continuous voltage $x$. A comparator device, connected to an amplifier A, receives voltage $x$ and the input voltage $x_0$. The amplified voltage $x_0-x$ controls circuit 200. If $x_0$ varies, the signal-current $I_s$ of cell 200 varies, as well as its output voltage. The balance is provided for $x=x_0$.

The device in FIG. 26 is similar to that of FIG. 25, but detector D and the comparator form a single system.

The device in FIG. 27 is similar to that in FIG. 24. It receive an input voltage $V_e$ and delivers an output voltage $V_s=XV_e$, the control current $I_s$ of circuit 200 being controlled by magnitude X the control current $I_s$ of circuit 200, being proportional to magnitude X.

Circuit 200 thus operates as a multiplier, which uses simple electrical means.

The device in FIG. 28 is a multiplier of the same type as that in FIG. 27, but operating with negative feedback. It comprises two circuits 200 and 201, a comparator-detector D and an amplifier A, connected as shown.

Circuit 201, detector D and amplifier A are connected as shown in FIG. 26. Circuit 201 receives a voltage 1 and delivers a voltage X which is detected and compared with voltage $x$.

The output signal of amplifier A controls simultaneously the circuits 201 and 200, which receives voltage $V_e$ and delivers voltage $V_s=V_e x$.

FIGS. 29 and 30 show how the characteristics of the curves in FIGS. 3 and 4 may be modified, in order:

To tune the quadripoles hereinabove within a broad range;

To vary the admittance A or impedance Z of the inductors according to a predetermined law, for example, with a view to improving the linearity within the greatest possible range.

A first possibility consists, as known, to connect across the input terminals 2, 2' of the variable inductor two conveniently selected impedances 40, 41 (in this case: one inductor and one capacitor).

Another possibility resides in giving the cores 103, 104 suitable shapes. FIG. 30 shows two suitably shaped cores, by way of example. However, it may be shown that by acting both on the shape and the spacing of the cores and the composition of the ferrites, sufficient parameters are available to obtain predetermined curves such as:

$$A=f(I_s)$$

or $$Z=f(I_s)$$

What is claimed is:

1. In a quadripole of the type having a pair of input terminals and a pair of output terminals, and a set of fixed capacitors and adjustable inductors for interconnecting said input terminals to said output terminals, said quadripole being tuned to a fixed operating frequency, when one pair of terminals of shorted: at least one set of adjustable inductors, said inductors comprising at least two magnetic circuits identical to each other and in each circuit: a first coil surrounding at least one part of said magnetic circuit; means for feeding to said first coils of said first and second circuits, respectively first and second adjustable D.C. currents having a constant sum, whereby the permeability of the magnetic circuits is caused to vary under action of a D.C. control, the magnitudes of the currents being such that the admittances of the related coils are substantially linear functions of the related currents; second coils surrounding at least a part of said magnetic circuit, said second coils of said first and said second circuits having respectively pairs of terminals respectively connected to said input and said output terminals of said quadripole.

2. In a quadripole of the type having a pair of input terminals and a pair of output terminals, and a set of capacitors and inductors for interconnecting said input terminals to said output terminals, said quadripole being series resonant at fixed operating frequency, when one pair of terminals is shorted, at least one set of adjustable inductors, inductors comprising: at least two magnetic circuits identical to each other and in each circuit; a first coil surrounding at least one part of said magnetic circuit; means for feeding to said first coils of said first and second circuits, respectively first and second adjustable D.C. currents having a constant sum; second coils surrounding at least a part of said magnetic circuit, said second coils of said first and said second circuits having respectively pairs of terminals respectively connected to said input and said output terminals of said quadripole.

3. In a quadripole of the type having a pair of input terminals and a pair of output terminals, and a set of capacitors and inductors for interconnecting said input terminals to said output terminals, said quadripole being parallel resonant at a first operating frequency, when one pair of terminals is shorted, at least one set of adjustable inductors, inductors comprising: at least two magnetic circuits identical to each other and in each circuit; a first coil surrounding at least one part of said magnetic circuit; means for feeding to said first coils of said first and said second circuit, respectively first and second adjustable D.C. currents having a constant sum; second coils surrounding at least a part of said magnetic circuit, said second coils of said first and said second circuits having respectively pairs of terminals respectively connected to said input and said output terminals of said quadripole.

4. In a multiplying quadripole of the type having first and second input terminals, first and second output terminals, and a set of fixed capacitors having the same admittance connecting respectively said input terminals and said output terminals: a first set of adjustable equal inductors for connecting respectively said first input to said first output, and said second input to said second output set of adjustable equal inductors for connecting respectively said first input to said second output and said second input to said first output, the sum of the admittances of the inductors, of the two sets remaining equal to a same constant, equal in absolute value to said same admittance; an inductor in each set comprising a magnetic circuit; a first coil surrounding at least one part of said magnetic circuit; means for feeding an adjustable D.C. current to said first coil; second coils surrounding at least one part of said magnetic circuit, said second coils having respectively pairs of terminals respectively connected to said input and of said output terminals of said quadripole, said magnetic circuits of said first and said second sets being identical to each other, and the adjustable currents in said first and in said second circuits having a constant sum, whereby the permeability of the magnetic circuits is caused to vary under action of a D.C. control, the magnitudes of the currents being such that the admittances of the related coils are substantially linear functions of the related currents.

5. In a multiplying quadripole for operating at a resonant frequency of the type having first and second input terminals, first and second output terminals, and a set of fixed capacitors having the same admittance connecting respectively said input terminals and said output terminals: a first set of adjustable equal inductors for connecting respectively said first input to said first output, and said second input to said second output and a second set of adjustable equal inductors for connecting respectively said first input to said second output, and said second input to said first output, the admittances of the inductors, in each set, remaining equal and the sum of the admittances of one inductor of said first set and one inductor of said second set remaining equal to a same constant, equal in absolute value to said same admittance at said resonance frequency, each inductor comprising a magnetic assembly; a first coil facing one pot of said magnetic assembly; two second identical pots in said magnetic assembly, and two second coils surrounding said second pots respectively, said second coils being series connected, a first source for feeding a first D.C. current having a constant value, to said first coils, a second D.C. source for superimposing on said first current a second adjustable D.C. current, said second coils having free terminals respectively connected to said input terminal and said output terminal.

6. In a multiplying quadripole for operating at a resonant frequency of the type having a pair of input terminals and a pair of output terminals, and a set of fixed capacitors having the same admittance connecting respectively said input terminals and said output terminals: a first set of adjustable equal inductors for connecting respectively said first input to said first output and said second input to said second output, and a second set of adjustable equal inductors for connecting respectively said first input to said second output and said second input to said first output, the admittances of one inductor of one set and one inductor of the second set remaining equal in absolute value to said same admittance at said resonance frequency, each inductor set comprising a magnetic circuit, a first coil facing one pot of said magnetic circuit assembly; two second identical pots in said magnetic assembly, and two second coils surrounding said second pots respectively, a first source for feeding a fixed D.C. current, having a constant value, to said first coil, a second D.C. source for superimposing on said first current a second adjustable D.C. current; said second coils having terminals respectively connected to said input terminals and said output terminals.

7. In a multiplying quadripole for operating at a resonant frequency of the type having a pair of input terminals and a pair of output terminals, and a set of fixed capacitors having the same admittance connecting respectively said input terminals and said output terminals: a first set of adjustable equal inductors for connecting respectively said first input to said first output and said second input to said second output, and a second set of adjustable equal inductors for connecting respectively said first input to said second output and said second input to said first output, the sum of the admittances of the inductors in each set remaining equal and the sum of the admittances of one inductor of said first set and one inductor of said second set remaining equal to the same constant, equal in absolute value to said same admittance at said resonance frequency; each inductor in each set comprising a hollow cylinder and two covers closing said cylinder and forming a first magnetic circuit; a first coil in said cylinder coaxial therewith; two cores identical to each other, extending in said cylinder parallelly to each other and perpendicularly to said covers, from one cover to the other, and forming therewith respective second magnetic circuits; two identical coils respectively surrounding said cores, said second coils being series connected; a first source for feeding to said first coil a first D.C. current having a constant value; a second D.C. source for superimposing on said first D.C. current a second adjustable D.C. current; said second coils having respective free terminals respectively connected to said input terminal and said output terminal.

8. In a multiplying quadripole for operating at a resonant frequency of the type having a first and a second input terminal and a first and a second output terminal, and a set of fixed capacitors having the same admittance connecting respectively said input terminals and said output terminals; a first set of adjustable equal inductors for connecting respectively said first input to said first output and said second input to said second output, and a second set of adjustable equal inductors for connecting respectively said first input to said second output, and said second input to said first output, the sum of the admittances of the inductors in each set remaining equal and the sum of the admittances of one inductor of said first set and one inductor of said second set remaining equal to a same constant, equal in absolute value to said same admittance at said resonance frequency, each set of inductors comprising a hollow cylinder and two covers closing said cylinder and forming a first magnetic circuit; a first coil in said cylinder, and coaxial therewith; two cores identical to each other, extending in said cylinder parallelly to each other and perpendicularly to said covers, from one cover to the other, and forming therewith respective second magnetic circuits; two identical coils respectively surrounding said cores; a first source for feeding to said first coil a first D.C. current having a constant value; a second D.C. source for superimposing on said first D.C. current, a second adjustable D.C. current; said second coils having respective terminals respectively connected to said input terminal and said output terminal.

9. In a tripole of the type having a pair of input terminals and a pair of output terminals, one input terminal and one output terminal being grounded and a set of capacitors and inductors for interconnecting said input terminals to said output terminals, said tripole being tuned to a fixed operating frequency, when one pair of terminals is shorted, at least one set of adjustable inductors, said inductors comprising: a magnet circuit, a first coil surrounding at least one part of said magnetic circuit; means for feeding an adjustable D.C. current to said first coil whereby the permeability of the magnetic circuit is caused to vary under action of a D.C. control, the magnitude of the current is such that the admittance of the related coil is a substantially linear function of the related current; second coils surrounding at least one part of said magnetic circuit; said second coils having respectively pairs of terminals respectively connected to said input and said output terminals of said tripole.

10. In a tripole of the type having a pair of input terminals and a pair of output terminals, one input terminal and one output terminal being grounded, and a set of capacitors and inductors for interconnecting said input terminals to said output, said tripole being parallel resonant at a first operating frequency, when one pair of terminals is shorted, at least one set of adjustable inductors, said inductors comprising: a magnetic circuit, a first coil surrounding at least one part of said magnetic circuit; means for feeding an adjustable D.C. current to said first coil; second coils surrounding at least one part of said magnetic circuit, said second coils having respectively pairs of terminals respectively connected to said input and said output terminals of said tripole.

11. In a tripole of the type having a pair of input terminals and a pair of output terminals, one input terminal and one output terminal being grounded and a set of capacitors and inductors for interconnecting said input terminals to said output, said tripole being series resonant at fixed operating frequency, when one pair of terminals is shorted, at least one set of adjustable inductors, said inductors comprising: a magnetic circuit, a first coil surrounding at least one part of said magnetic circuit; means for feeding an adjustable D.C. current to said first coil; second coils surrounding at least a part of said magnetic circuit, said second coils having respectively pairs of terminals respectively connected to said input and said output terminals of said tripole.

12. In a multiplying quadripole, of the type having a first pair of extreme terminals and a second pair of extreme terminals, and a first and second pair of intermediate terminals, fixed capacitors having the same constant impedance for connecting respectively each first extreme terminal to one terminal of said first intermediate pair, and one terminal of said second intermediate pair to one second extreme terminal; variable inductors for interconnecting said intermediate terminals; said quadripole being series resonant at an operating frequency when one pair of extreme terminals is shorted; said inductors comprising: a magnetic assembly; a first coil facing one pot of said magnetic assembly; two second identical pots in said magnetic assembly, and two second coils surrounding said second pots respectively, said second coils being series connected; a first source for feeding a first D.C. current having a constant value, to said first coils, a second D.C. source for superimposing on said first current a second adjustable D.C. current, said second coils having free terminals respectively connected to said intermediate terminals.

13. In a multiplying quadripole for operating at a resonance frequency of the type having: a first pair and a second pair of extreme terminals and a first and a second pair of intermediate terminals: four capacitors having the same fixed impedance for interconnecting respectively each intermediate terminal to each extreme terminal; a first and second set of adjustable inductors for interconnecting respectively each intermediate terminal of said first pair to each intermediate terminal of said second pair; the impedances of the inductors in each set remaining equal, and the sum of one impedance of an inductor of a first set and one impedance of one inductor of a second set remaining equal in absolute value to said first impedance at said resonance frequency: each inductor comprising a magnetic assembly; a first coil facing one pot of said magnetic assembly; two second identical pots in said magnetic assembly, and two second coils surrounding said second pots respectively, said second coils being series connected; a first source for feeding a first D.C. current having a constant value, to said first coils, a second D.C. source for superimposing on said first current a second adjustable D.C. current; said second coils having free terminals respectively connected to said first intermediate terminals and to said second intermediate terminals.

14. In a multiplying quadripole of the type having: a first pair and a second pair of extreme terminals and a first and a second pair of intermediate terminals: four capacitors having the same fixed impedance for interconnecting respectively each intermediate terminal to each extreme terminal; a first and a second set of adjustable inductors for interconnecting respectively said intermediate terminals of said first pair to said intermediate terminals of said second pair: the impedance of the inductors in each set remaining equal, and the sum of one impedance of an inductor of a first set and one impedance of one inductor of a second set remaining equal in absolute value to said fixed impedance; each inductor comprising: a hollow cylinder and two covers closing said cylinder and forming a first magnetic circuit; a first coil in said cylinder coaxial therewith; two cores identical to each other, extending in said cylinder parallelly to each other and perpendicularly to said covers, from the cover to the other, and forming therewith respective second magnetic circuits: two identical coils respectively surrounding said cores, said second coils being series connected; a first source for feeding to said first coil a first D.C. current having a constant value; a second D.C. source for superimposing on said first D.C. current a second adjustable D.C. current; said second coils having respective free terminals respectively connected to said intermediate terminals of said first and said second pair.

15. In a multiplying quadripole for producing an output signal which is proportional to the product of two input signals and which is of the type having: a first pair and a second pair of extreme terminals and a first and a second pair of intermediate terminals; four capacitors having the same fixed impedance for interconnecting respectively each intermediate terminal to each extreme terminal; a first and a second set of adjustable inductors for interconnecting respectively said intermediate terminals of said first pair to said intermediate terminals of said second pair; the impedance of the inductors in each set remaining equal, and the sum of one impedance of an inductor of a first set and one impedance of one inductor of a second set remaining equal in absolute valve to said fixed impedance; each set of inductors comprising a hollow cylinder and two covers closing said cylinder and forming a first magnetic circuit: a first coil in said cylinder, coaxial therewith; two cores identical to each other, extending in said cylinder parallelly to each other and perpendicularly to said covers, from one cover to the other, and forming therewith respective second magnetic circuits: two identical coils respectively surrounding said cores, a fixed source for feeding to said first coil a first D.C. current having a constant value; a second D.C. source for superimposing on said first D.C. current, a second adjustable D.C. current; said second coils having respective terminals respectively connected to intermediate terminals of said first and said second pair.

(References on following page)

References Cited by the Examiner

UNITED STATES PATENTS

| | | | |
|---|---|---|---|
| 2,076,248 | 4/1937 | Norton | 330—70 |
| 2,115,138 | 4/1938 | Darlington | 333—74 |
| 2,432,399 | 12/1947 | Edwards | 323—75 |
| 2,785,853 | 3/1957 | Honore et al. | 235—193 |
| 2,946,000 | 7/1960 | Molick | 323—89 |
| 2,948,818 | 8/1960 | Goto | 330—63 |
| 2,948,819 | 8/1960 | Goto | 307—88 |
| 3,127,555 | 3/1964 | Honore | 323—75 |

HERMAN KARL SAALBACH, *Primary Examiner.*

C. BARAFF, *Assistant Examiner.*